April 7, 1953 — J. J. BEAN — 2,633,987
VISCOSITY CONTROL IN HEAVY MEDIA SEPARATION
Filed Dec. 27, 1948
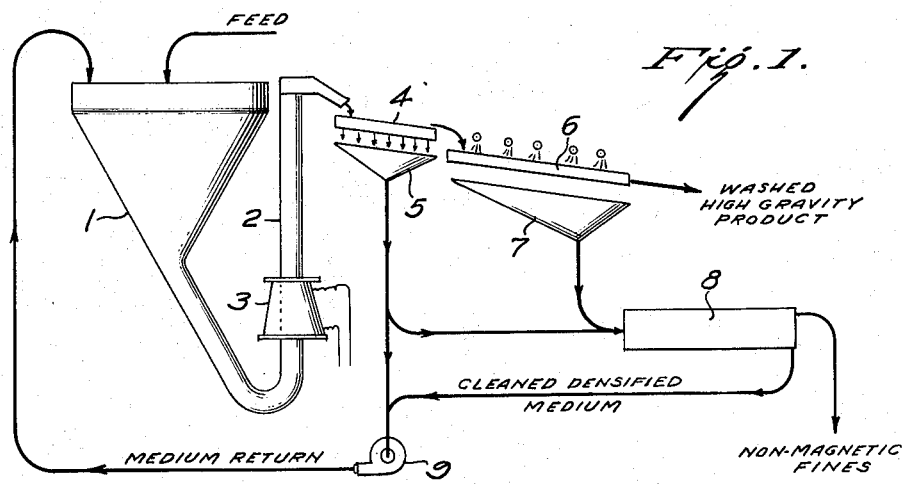
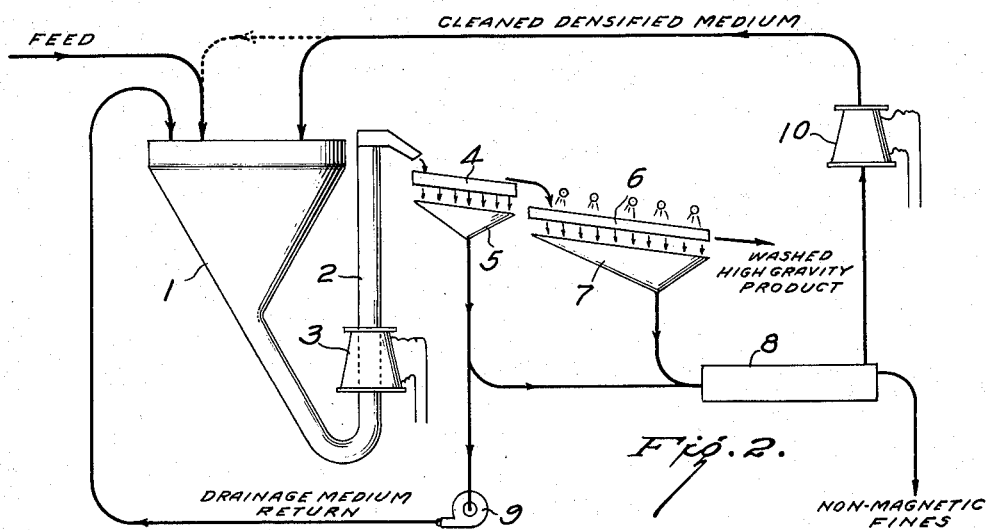
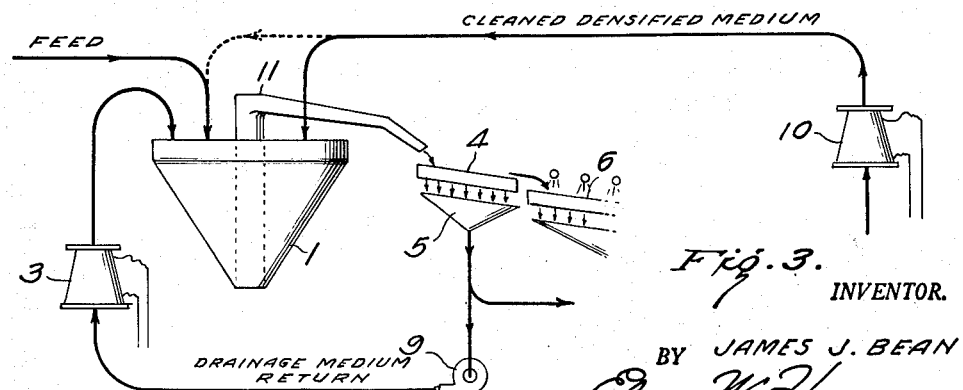
INVENTOR.
BY JAMES J. BEAN,
Omer W. Harmon
ATTORNEY Patented Apr. 7, 1953

2,633,987

UNITED STATES PATENT OFFICE 2,633,987

VISCOSITY CONTROL IN HEAVY MEDIA SEPARATION

James Joseph Bean, Riverside, Conn., assignor to American Cyanamid Company, New York, N. Y., a corporation of Maine Application December 27, 1948, Serial No. 67,440

1 Claim. (Cl. 209—39)

This invention relates to an improvement in heavy media separation of solid particles making use of magnetically-susceptible medium solids. In particular, the invention is concerned with an improved method of controlling the viscosity of the separatory fluid and the rate of settling of the medium solids therethrough.

In the past few years, a growing industrial interest has developed in various operations for the separation of solid particles by means of gravity differentials. Therein a mixture of particles having different specific gravities is immersed in a fluid having a density approximating, and usually between the gravities of the particles to be separated. In the more usual case where the fluid density is intermediate the specific gravities of the solids, the particles are separated into a "float" fraction of lesser gravity than the fluid and a "sink" fraction of greater gravity than the fluid. In operations where the fluid is of lesser density than the lower gravity particles, a series of portions are obtained, each comprising a mixture of low-gravity particles in a size band having a selected settling rate and smaller but greater-gravity particles having substantially the same settling rate. The effect of the heavy density fluid is to spread the difference in size band between the particles of differing gravity. Each portion then may be readily separated into low and high gravity fractions by simple screening. Variations have also been proposed in which centrifugal force is used to obtain a separating force greater than normal gravity.

In any case, a fluid of apparent density greater than unity is ordinarily required. Industrially, the most useful of such fluids are suspensions in water of "medium" solids which are so finely-divided as to be semi-permanently suspended. Further, since economically feasible operation requires recovery and reuse of the medium solids, the more desirable of such separatory fluids are those in which the medium solids are magnetically-susceptible and have magnetic remanence so that they may be magnetically recovered and/or cleaned. Before reuse, the solids are demagnetized. The present invention is particularly concerned with those operations which make use of such magnetic recovery and/or cleaning.

Certain problems are involved in making up and maintaining any satisfactory heavy-media separatory fluid. Among other problems, for example, depending upon the size and density of the medium solids, a density gradient sets up in the separatory vessel, due, not only to settling of the heavy gravity particles but also of the medium solids. This must be controlled within certain limitations. Otherwise, operation becomes inefficient, if not actually impractical.

Another difficulty is occasioned by the amount of medium solids which must be suspended. In order to achieve the desired apparent density, the requisite amount of solids which must be suspended may produce a fluid of too great viscosity to permit efficient and rapid settling therethrough of the solids mixture being treated. Especially is this true when the amounts of fines in the mixture to be treated are large. They not only settle slowly but aggravate the difficulty. Viscosity, therefore, must be controlled within certain limits. Another problem lies in the fact that recirculation of the medium solids requires a certain differential head between the densifier and separatory vessel circuit. As this becomes excessive, operation also becomes inefficient.

In the past, various proposals have been made to control these factors and overcome at least in part the difficulties which they produce. Not all of these procedures, however, have been wholly satisfactory. Some are not operable to the desired efficiency. Some require excessive amounts of extra equipment. Some require so great a degree of control that operation cannot be equalized.

It is, therefore, the principal object of the present invention to devise a procedure whereby in the use, recovery, and reuse of magnetically-susceptible medium solids the viscosity of the separatory fluid, the degree of flocculation of medium solids, the rate of settling of medium solids and the kindred problems and the like may be accurately and easily controlled and the head requirements between the densifier and separatory vessel medium circuits may be reduced.

Surprisingly, the desired objects of the present invention are readily accomplished by recognition of a fact previously not recognized about magnetic recovery systems. It is now generally recognized that the medium solids, before reuse, must be demagnetized in order to prevent flocculation and obtain uniform dissemination. The general practice, therefore, has been to demagnetize all medium solids which are recovered and cleaned for reuse.

In accordance with the present invention, it has been found that there is no necessity for demagnetizing all the cleaned medium solids. In other words, the process of the present invention is based on the new principle that the amount of medium which is demagnetized, within reasonable limits, may be entirely independent of the amount of medium which is cleaned. By separating these two functions the degree of demagnetization of the total amount of solids in circulation may be accurately controlled. By controlling this factor, the degree of flocculation of the medium solids also can be controlled and as a result control is obtained of the density differential in the fluid in the separatory vessel.

Once the principle of the present invention is recognized, it is apparent that it is not necessarily dependent upon any one particular arrangement of apparatus. Therefore, the invention will be more fully discussed in conjunction with the accompanying drawing which exhibits schematically, in Figures 1, 2 and 3, several useful arrangements of apparatus and the flow of fluids therethrough. These figures are diagrammatic and for illustrative purposes only. Therefore, only treatment of the "sink" fraction is shown, treatment of the float fraction being omitted for purposes of clarity. The treatment thereof is similar and discussed below.

In a typical arrangement, such as is schematically diagramed in Figure 1, there is shown a conventional separatory vessel 1 having an external lift conduit 2 for the heavy gravity fraction. The external lift conduit is surrounded for part of its length by a demagnetizing coil 3 through the conventional leads of which varying amounts of alternating current may be applied. The sink fraction is discharged onto a suitable drainage screen 4 which has a suitable receiver 5 for the drainage medium which passes therethrough. The drained fraction passes to a conventional washing screen 6. From the latter, the washings are collected in a suitable receiver 7 and passed to a conventional medium recovery and cleaning circuit generally indicated at 8. As shown, a portion of the drainage medium may also be sent to the cleaning system 8. The remainder of the drainage medium is combined with cleaned, densified, but otherwise not demagnetized, medium from the medium cleaning circuit 8. This is returned as by a suitable pump 9 to the separatory vessel 1. As noted above, for purposes of illustration only the sink fraction treatment is shown. A similar set of screens is of course provided for the lighter-gravity fraction, the screen underflows being either separately treated or combined with those from screens 4 and 6. The screening, washing and recovery systems, except as to the location of the demagnetizing coil and the extent of demagnetization, are conventional.

In Figure 2 a somewhat different flow using the same apparatus is indicated. Instead of combining the cleaned, densified but not demagnetized medium in combination with the sink screen-drainage medium, it is returned directly to separatory vessel 1. However, a supplemental demagnetizing coil 10 is provided in this line, which by varying the current therethrough may be made to further control the extent of total demagnetization. If desired, as shown, a portion thereof may be used to prewet a portion of the feed. In many cases where coil 10 is used sufficient control can be obtained by its use alone and coil 3 may be powered but lightly or even discarded.

In Figure 3 a somewhat different arrangement is shown. The separatory vessel 1, instead of being equipped with the external lift 2, is provided with an internal lift 11. The screen arrangement is similar to that in Figure 2 as is the return of the cleaned, densified medium, a coil 10 being provided in the line from the cleaning and densifying system 8. Demagnetizing coil 3, however, instead of being located on the sink lift, is around the conduit through which the drainage medium is recycled. In many cases this is physically a simpler system to install and the degree of control obtained will be similar to that of the arrangements shown in Figures 1 and 2. If so desired, however, coil 3 instead of being located as in Figure 3 could have been placed about the sink lift conduit 11. It might be placed either above the fluid in tank 1 or submerged therein.

From the foregoing it is believed that it will be clear that the present invention involves certain elements of operating practice but that otherwise it may be adapted to substantially any heavy media separation procedure using magnetically-recoverable medium solids. These elements are the separation of the extent to which medium is demagnetized from the amount of medium cleaned and the provision for control of the extent of the total demagnetizing action.

This latter may be obtained, either by varying the amount of demagnetizing energy applied to a substantially constant fluid flow through the demagnetizing field, or by varying the amount of material passed through either a constant or a controlled but variable demagnetizing field. The former is shown in Figures 1 and 2, the latter in Figures 2 and 3. In either event, an accurate control is obtained of the extent of demagnetization of the total amount of magnetizable solids which is in the separatory vessel during separation.

If these features are present, the advantages of the invention may be obtained regardless of the particular pieces of apparatus involved in the overall flow scheme and regardless of the nature of the fluid flows which are otherwise utilized.

No definite rules as to the amount of medium to be demagnetized may be laid down. It should be a major portion. Only a relatively small amount of residual magnetism in the solids in the separatory vessel is ordinarily required to obtain the control accomplished by the present invention. The precise limits must be selected and governed by the size of the apparatus and the nature of the material in use. Obviously the residual magnetic influence used as viscosity control should not be too great as otherwise excessive flocculation of the medium will occur, the density gradient then will become excessive and the operation will lose its utility.

I claim:

In the separation of mixtures of solid particles of differing specific gravities by heavy-media separation accomplished in a fluid comprising a suspension in a liquid of finely-divided magnetizable "medium" solids wherein a portion of the "medium" solids removed with the separated products is drained therefrom and returned to the separatory operation and the remainder is magnetically recovered and cleaned for reuse; the improved method of controlling the viscosity, degree of flocculation and density differential in the separatory fluid which comprises: controlling the degree of demagnetization of the total amount of "medium" solids in circulation by varying the amount of flow of recycled "medium" solids and the power input to a demagnetizing field.

JAMES JOSEPH BEAN.

REFERENCES CITED

The following references are of record in the file of this patent:

UNITED STATES PATENTS

| Number | Name | Date |
|---|---|---|
| 2,373,635 | Wuensch | Apr. 10, 1945 |

FOREIGN PATENTS

| Number | Country | Date |
|---|---|---|
| 828,613 | France | Feb. 21, 1938 |
| 679,429 | Germany | Aug. 5, 1939 |